United States Patent
Naylor et al.

(10) Patent No.: US 10,742,611 B2
(45) Date of Patent: Aug. 11, 2020

(54) METHOD, A SYSTEM AND COMPUTER PROGRAM PRODUCTS FOR SECURELY ENABLING IN-NETWORK FUNCTIONALITY OVER ENCRYPTED DATA SESSIONS

(71) Applicant: TELEFONICA DIGITAL ESPAÑA, S.L.U., Madrid (ES)

(72) Inventors: David Naylor, Madrid (ES); Kyle Schomp, Madrid (ES); Matteo Varvello, Madrid (ES); Ilias Leontiadis, Madrid (ES); Jeremy Blackburn, Madrid (ES); Diego Lopez, Madrid (ES); Konstantina Papagiannaki, Madrid (ES); Pablo Rodriguez Rodriguez, Madrid (ES); Peter Steenkiste, Madrid (ES)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 111 days.

(21) Appl. No.: 15/740,893

(22) PCT Filed: Jun. 1, 2016

(86) PCT No.: PCT/EP2016/062340
§ 371 (c)(1),
(2) Date: Dec. 29, 2017

(87) PCT Pub. No.: WO2017/001133
PCT Pub. Date: Jan. 5, 2017

(65) Prior Publication Data
US 2018/0198761 A1 Jul. 12, 2018

(30) Foreign Application Priority Data
Jul. 2, 2015 (EP) .................................. 15382354

(51) Int. Cl.
H04L 29/06 (2006.01)
H04L 9/08 (2006.01)
H04L 9/32 (2006.01)

(52) U.S. Cl.
CPC ........ *H04L 63/0281* (2013.01); *H04L 9/0822* (2013.01); *H04L 9/0838* (2013.01);
(Continued)

(58) Field of Classification Search
CPC . H04L 63/0281; H04L 9/0822; H04L 9/0838; H04L 9/0869; H04L 9/3268;
(Continued)

(56) References Cited

U.S. PATENT DOCUMENTS 5,657,390 A * 8/1997 Elgamal .................. H04L 29/06
713/151
6,711,679 B1 * 3/2004 Guski ................. H04L 63/0428
713/156
(Continued)

OTHER PUBLICATIONS

Yongguang Zhang et al., "A Multi-Layer IPsec Protocol", Proceedings or the 9th USENIX Security Symposium, Aug. 17, 2000, pp. 1-16.
(Continued)

*Primary Examiner* — Shahriar Zarrineh
(74) *Attorney, Agent, or Firm* — Sughrue Mion, PLLC

(57) ABSTRACT

A method, a system and computer program products for securely enabling in-network functionality over encrypted data sessions, the method involving establishing an encrypted data session between a client communication application (100) and a server communication application (200) over a communication network; receiving and/or transmitting, by the client communication application (100), in the established encrypted data session, at least one encrypted communication data (D) from/to the server communication application (200) through a computing network
(Continued)

element (M); and performing, by the computing network element (M), different actions other than data packet forwarding from one communication application to the other on the encrypted communication data (D). The encrypted communication data (D) has a plurality of data portions, or contexts, (CTX), each encrypted by a context key, and the different actions being specific for the computing network element (M) and for one or more of the contexts (CTX_X).

8 Claims, 4 Drawing Sheets

(52) U.S. Cl.
CPC .......... *H04L 9/0869* (2013.01); *H04L 9/3268* (2013.01); *H04L 63/0428* (2013.01); *H04L 63/0435* (2013.01); *H04L 63/061* (2013.01); *H04L 63/105* (2013.01); *H04L 63/166* (2013.01)

(58) Field of Classification Search
CPC ............. H04L 63/0428; H04L 63/0435; H04L 63/061; H04L 63/105; H04L 63/166
USPC ......................................................... 713/153
See application file for complete search history.

(56) References Cited

U.S. PATENT DOCUMENTS

| | | | | |
|---|---|---|---|---|
| 6,819,766 | B1* | 11/2004 | Weidong | H04L 9/088 380/277 |
| 7,069,434 | B1* | 6/2006 | Ilnicki | H04L 9/0825 380/259 |
| 2002/0091921 | A1* | 7/2002 | Kunzinger | H04L 63/0428 713/153 |
| 2003/0014628 | A1* | 1/2003 | Freed | H04L 63/0281 713/155 |
| 2003/0149871 | A1* | 8/2003 | Medvinsky | H04L 63/0807 713/155 |
| 2004/0250059 | A1* | 12/2004 | Ramelson | H04L 63/0428 713/150 |
| 2005/0102507 | A1* | 5/2005 | Sozzani | H04L 63/0428 713/165 |
| 2006/0090074 | A1* | 4/2006 | Matoba | H04L 63/0272 713/171 |
| 2007/0288754 | A1* | 12/2007 | Kaji | H04L 67/14 713/175 |
| 2011/0202988 | A1* | 8/2011 | Otranen | H04L 63/0815 726/8 |
| 2011/0289311 | A1 | 11/2011 | Roy-Chowdhury et al. | |
| 2013/0039487 | A1* | 2/2013 | McGrew | H04L 69/04 380/44 |
| 2013/0191631 | A1* | 7/2013 | Ylonen | H04L 63/164 713/153 |
| 2014/0219453 | A1* | 8/2014 | Neafsey | H04B 5/0056 380/270 |
| 2014/0222955 | A1* | 8/2014 | Islam | H04L 63/0876 709/217 |
| 2014/0337614 | A1* | 11/2014 | Kelson | H04L 63/168 713/152 |
| 2015/0052188 | A1* | 2/2015 | Herberg | H04L 63/0428 709/203 |
| 2015/0146733 | A1* | 5/2015 | Haney | H04L 12/4633 370/392 |

OTHER PUBLICATIONS

Joel Sing et al., "A Critical Analysis of Multilayer IP Security Protocol", Information Technology and Applications, 2005. ICITA 2005. Third International Conference on Sydney, Australia Jul. 4, 2005, Piscataway, NJ, USA, IEEE, Jul. 4, 2005, pp. 683-688, vol. 2.
Ya-Hang Zhang et al., "ML-IKE: A Multilayer IKE Protocol for TCP Performance Enhancement in Wireless Networks", International Conference on Space Information Technology 2009, Proc. of SPIE, Apr. 2, 2010, vol. 7651, pp. 765102-1-765102-9.
International Search Report of PCT/EP2016/062340 dated Jul. 7, 2016 [PCT/ISA/210].
Written Opinion of PCT/EP2016/062340 dated Jul. 7, 2016 [PCT/ISA/237].

* cited by examiner

METHOD, A SYSTEM AND COMPUTER PROGRAM PRODUCTS FOR SECURELY ENABLING IN-NETWORK FUNCTIONALITY OVER ENCRYPTED DATA SESSIONS

CROSS REFERENCE TO RELATED APPLICATIONS

This application is a National Stage of International Application No. PCT/EP2016/062340, filed Jun. 1, 2016, claiming priority based on European Patent Application No. 15382354.7, filed Jul. 2,2015, the contents of all of which are incorporated herein by reference in their entirety.

TECHNICAL FIELD

The present invention is directed, in general, to the field of Internet security. In particular, the invention relates to methods and systems for securely enabling in-network functionality over encrypted data sessions.

In present invention, 'middleboxes' are computing network elements that run "inside" a network, sitting logically between the endpoints (a client application and a server application) of communication sessions. A client application (e.g., a web browser) can connect to a server application (e.g., a web server) via one or more middleboxes that add value beyond basic data transport. Users own/manage client applications and content providers own/manage servers applications. The entire communication, across all parties, is a data session; connections link individual hops in the data session (e.g., a TCP connection between the client application and a middlebox).

Present invention focuses on application level middleboxes, also called proxies or in-path services, which has access to application data. These middleboxes may perform functions like intrusion detection, content filtering, caching, data compression and parental control, among others.

BACKGROUND OF THE INVENTION

Transport Layer Security (TLS) is the standard protocol for providing authenticity and confidentiality on top of TCP connections. Today, it is used to provide a secure version of traditional protocols (e.g., IMAP, SMTP, XMPP, etc.); in particular, the usage of HTTP over TLS is commonly known as HTTPS. Each TLS connection begins with a handshake between a server and a client. In this handshake, the Public Key Infrastructure (PKI) suite is used to authenticate the server (and eventually the client) and to generate cryptographic keys to create a secure channel over which data are transmitted.

TLS has seen wide adoption and is currently carrying a significant fraction of the overall HTTP traffic (Facebook™, Google™ and Twitter™ use it by default). TLS makes the fundamental assumption that all functionality resides solely at the endpoints, and is thus unable to utilize the many in-network services that optimize network resource usage, improve user experience, and protect clients and servers from security threats. Reintroducing such in-network functionality into secure TLS sessions today is done through hacks, in many cases weakening overall security.

Four solutions aiming to insert middleboxes in TLS sessions are at present known:

Custom root certificate: This solution consists of installing a custom root certificate on a client, allowing the middlebox to create a certificate for itself purporting to be the intended server. The middlebox then connects to the server and passes the data from one connection to the other. Contrary to present invention, in this solution, there is no mechanism for authenticating the middlebox. Even worse, the middlebox is completely transparent to the server. On the client, only a deep inspection of the certificate chain would reveal the presence of a forged certificate. Moreover, the client has no guarantees beyond the first hop. While the connection to the middlebox is encrypted, the client cannot verify that TLS is being used from the middlebox to the server, whether additional middleboxes are present, or whether the endpoint of the session is even the intended server. Also, middleboxes get full read/write access to the data stream. In one hand, many middleboxes only need selective access to the data stream. In the other hand, clients should be empowered with control on what data to share or not. Finally, endpoints (and middleboxes) cannot detect in-flight modifications.

"I'm a proxy" certificate flag: A 2014 IETF draft from Ericsson™ and AT&T™ that proposes using the X.509 Extended Key Usage extension to indicate that the certificate belongs to a proxy [1]. Upon receiving such a certificate during a TLS handshake protocol, the client agent would omit the domain name check (presumably after securing user permission) and establish a TLS session with the proxy, which would in turn open a connection with the server. Based on client preferences, the client agent might only accept proxy certificates for certain sessions. In this case, the client has no guarantees beyond the first hop, and middleboxes get full read/write access to the data stream. Moreover, in this solution, endpoints (and middleboxes) cannot either detect in-flight modifications.

Pass Session Key Out-of-Band: Another IETF draft, this one from Google™ assumes that the client maintains a persistent TLS connection with the proxy and multiplexes multiple sessions over that connection. After establishing an end-to-end TLS connection with the server (which the proxy blindly forwards), the client passes the session key to the proxy before transmitting data on the new connection [2]. Again, the user agent can selectively grant the proxy access on a per-connection basis based on user preference. This solution suffers in that middleboxes get also full read/write access to a TLS session. Compared to the solutions above, this approach limits a middlebox access to the TLS session specifically indicated by the client. However, within a TLS session a middlebox still gets full read/write access. Moreover, the server is unaware that trusted middleboxes are added to a secure session at the consent of both endpoints, and endpoints (and middleboxes) cannot either detect in-flight modifications.

Ship a Custom Browser: This solution consists of modifying the browser itself to accept certificates from certain trusted proxies. This is the approach Viasat™ is taking for its Exede® satellite Internet customers. In this solution, there is neither a mechanism for authenticating the middlebox, being the middlebox transparent to the server. On the client, only a deep inspection of the certificate chain would reveal the presence of a forged certificate. Moreover, the client has neither guarantee beyond the first hop. While the connection to the middlebox is encrypted, the client cannot verify that TLS is being used from the middlebox to the server, whether additional middleboxes are present, or whether the endpoint of the session is even the intended server.

Middleboxes get also full read/write access to the data stream. In one hand, many middleboxes only need selective access to the data stream. In the other hand, clients should be empowered with control on what data to share or not. Also, this solution requires custom browser installation, and endpoints (and middleboxes) cannot either detect in-flight modifications.

SUMMARY OF THE INVENTION

Embodiments of the present invention provide according to a first aspect a method for securely enable in-network functionality over encrypted data sessions. The method comprises: establishing an encrypted data session between two communication applications, a client communication application and a server communication application, over a communication network; receiving and/or transmitting, by the client communication application, in said established encrypted data session, encrypted communication data from/ to said server communication application through at least one computing network element; and performing, by a computing network element, different actions other than data forwarding from one communication application to the other on the encrypted communication data.

According to the proposed method, the encrypted communication data include a plurality of data portions, also termed as contexts, each one being encrypted and authenticated via context keys. Moreover, the different actions are specific for the computing network element and for one or more of the plurality of contexts of the encrypted communication data.

The context keys are computed according to an embodiment by means of a pseudo random function (PRF) to which both communication applications contribute with half of a shared secret, or context key material, the shared secret being used to generate the PRF. Alternatively, this operation can be moved to the client only.

The different actions the computing network element can perform may comprise read and/or write permissions on the one or more contexts of the encrypted communication data.

According to an embodiment, the computing network element negotiates, with both communication applications, before performing the different actions on the one or more contexts, a symmetric key using any standard key exchange protocol. Then, each communication application generates, for each one of the one or more contexts of the encrypted communication data to which the computing network element has rights to, half of the shared secret for the PRF, and sends to the computing network element the corresponding half of the shared secret in encrypted form using said negotiated symmetric key. Finally, the computing network element computes the context keys using PRF; context keys are used to decrypt communication data and perform the different actions the computing network element has rights to.

In addition, the computing network element may provide to both of the two communication applications its own certificate. In this case, the two communication applications will verify the received certificate of the computing network element before contributing to the computation of the context keys.

According to an embodiment, the encrypted data session is a Transport Layer Security, TLS, session. Alternatively, the encrypted data session is an OpenStack message passing session.

Other embodiments of the invention, according to other aspects, that are disclosed herein also include a system and software programs to perform the method embodiment steps and operations summarized above and disclosed in detail below. More particularly, a computer program product is one embodiment that has a computer-readable medium including computer program instructions encoded thereon that when executed on at least one processor in a computer element causes the processor to perform the operations indicated herein as embodiments of the invention.

Present invention provides endpoints of a data session explicit knowledge and control over which functional elements are part of the session. Moreover, present invention allows users and content providers to dynamically choose which data portions of content are exposed to in-network services (e.g., HTTP headers vs. content), and to protect the authenticity and integrity of data while still enabling access to certain in-network services by separating read and write permissions. Present invention is incrementally deployable.

BRIEF DESCRIPTION OF THE DRAWINGS

The previous and other advantages and features will be more deeply understood from the following detailed description of embodiments, with reference to the attached, which must be considered in an illustrative and non-limiting manner, in which.

DETAILED DESCRIPTION OF THE INVENTION AND OF SEVERAL EMBODIMENTS

Figure 1:
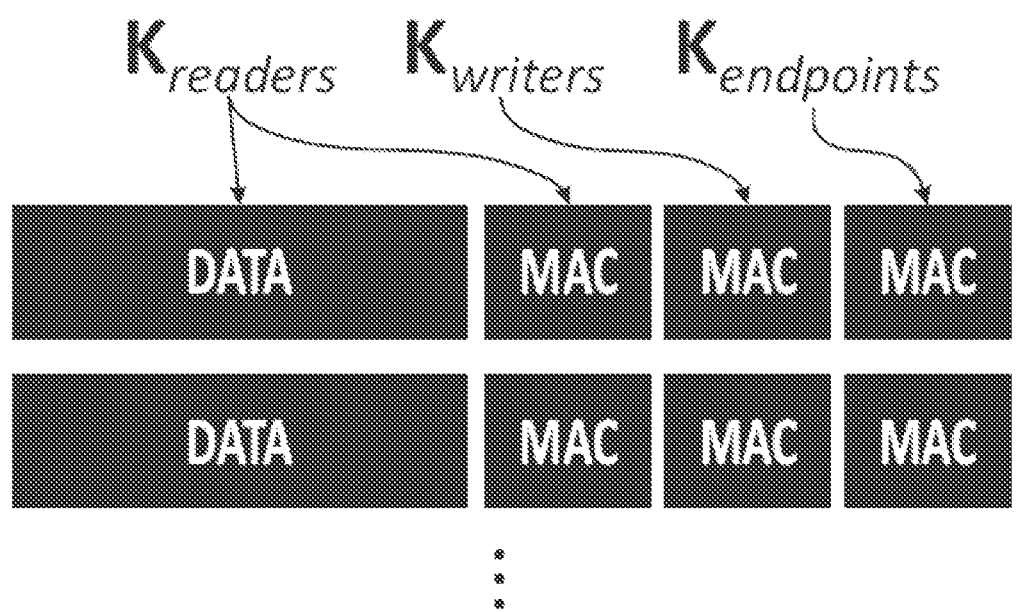
FIG. 1 is a graphical representation showing how $K_{readers}$, $K_{writers}$ and $K_{endpoints}$ are used.

Present invention provides a mechanism to explicitly and securely enable in-network functionality over encrypted data sessions. Although the mechanism is presented in the context of TLS, since TLS is the standard protocol to secure data sessions on the Internet, the proposed mechanism is broad and could be applied to other technologies like OpenStack, IPsec (layer 3) and tcpcrypt (layer 4). OpenStack is an open-source cloud computing software platform; the ideas here described could be used to enable in-cloud functionality while ensuring secure message passing. IPsec stands for Internet Protocol Security and it is a protocol suite for securing Internet Protocol (IP) communications by authenticating and encrypting each IP packet of a communication session. Accordingly, the ideas here described could be adopted to introduce in-network functionalities. Similarly, tcpcrypt introduces the same idea to TCP packets, and also could be extended with the ideas above.

Accordingly, now it will be described mcTLS, a modification of TLS incorporating the teachings of present invention to enable explicit and secure in-network functionality over TLS data sessions.

The term "context keys" as used herein refer to a set of symmetric encryption and message authentication code (MAC) keys for controlling who can read and write the data sent in a context, or data portion, CTX_X, of a communication data D. Communication applications 100, 200 can associate each context CTX_X with a purpose and access permissions for each middlebox M. For instance, web browsers/servers could use one context CTX_X for HTTP headers and another for content.

As in TLS, in mcTLS it is also distinguishable between a record and a handshake protocol. Now both these protocols will be explained in more detail.

Record Protocol

Controlling Read Access:

Each context CTX_X has its own reader context key (called $K_{readers}$). Possession of this context key constitutes read access so mcTLS can prevent a middlebox M from reading a context CTX_X by withholding that context's reader key.

Controlling Write Access:

To control write access, mcTLS takes the following "endpoint-writer-reader" approach to MACs. Each mcTLS record carries three keyed MACs, generated with the MAC keys from $K_{endpoints}$, $K_{writers}$ (shared by endpoints 100, 200 and writers (middleboxes M having write access for a context CTX_X)), and $K_{readers}$ (shared by endpoints 100, 200, writers and readers (middleboxes M having only read access for a context CTX_X).

Each context CTX_X has its own $K_{writers}$ and $K_{readers}$ but there is only one $K_{endpoints}$ for the data session since the endpoints 100, 200 have access to all contexts CTX.

Generating MACs:

When an endpoint 100, 200 assembles a record, it generates three MACs: one with $K_{readers}$, one with $K_{writers}$, and one with $K_{endpoints}$.

When a writer modifies a record, it generates MACs with $K_{writers}$ and $K_{readers}$ and simply forwards the original $K_{endpoints}$ MAC.

When a reader forwards a record, it leaves all three MACs unmodified.

Checking MACs:

When an endpoint 100, 200 receives a record, it checks the $K_{writers}$ MAC to confirm that no illegal modifications were made and it checks the $K_{endpoints}$ MAC to find out if any legal modifications were made (if the communication application cares).

When a writer receives a record, it checks the $K_{writers}$ MAC to verify that no illegal modifications have been made.

When a reader receives a record, it uses the $K_{readers}$ MAC to check if any third party modifications have been made.

It has to be noted that with the endpoint-writer-reader MAC scheme, readers cannot detect illegal changes made by other readers. The problem is that a shared context key cannot be used by an entity to police other entities at the same privilege level. Because all readers share $K_{readers}$ (so that they can detect third party modifications), all readers are also capable of generating valid $K_{readers}$ MACs.

There are two options for fixing this: (a) readers and writers/endpoints 100, 200 share pairwise symmetric keys; writers/endpoints 100, 200 compute and append a MAC for each reader, or (b) endpoints 100, 200 and writers append digital signatures rather than MACs; unlike $K_{writers}$ MACs, readers can verify these signatures.

This is only an issue when there are more than two readers for a context CTX_X, and readers not detecting reader modifications should generally not be a problem (reader modifications are still detectable at the next writer or endpoint 100, 200). The benefits seem insufficient to justify the additional overhead of (a) or (b), but they could be implemented as optional modes negotiated during the handshake protocol.

FIG. 1 illustrates how $K_{readers}$, $K_{writers}$ and $K_{endpoints}$ are used.

Handshake Protocol

The mcTLS handshake protocol is very similar to the TLS handshake protocol. First the details of context key generation will be explained and then the handshake itself.

Context Key Generation:

In TLS, the endpoints agree on a master secret, used to compute a pseudo-random function (PRF), which generates the session key. mcTLS endpoints 100, 200 establish a master secret and use it to generate $K_{endpoints}$ as in classic TLS; $K_{endpoints}$ is used for end-to-end MACs, for securely exchanging partial context secret between the client 100 and the server 200, and for authenticating the handshake via encrypting the Finished message. Additionally, each endpoint 100, 200 independently generates a partial context secret, which is passed to the PRF to generate $K^C_{writers}$ and $K^C_{readers}$ (at the client 100) and $K^S_{writers}$ and $K^S_{readers}$ (at the server 200) for each context CTX_X. At the end of the handshake protocol, middleboxes M compute $K_{writers}$=PRF ($K^C_{writers}$ $K^S_{writers}$, "writer keys", $rand_c$+$rand_s$) and $K_{readers}$=PRF ($K^C_{readers}$ $K^S_{readers}$, "reader keys", $rand_c$+$rand_s$), where PRF (secret, label, seed) is defined in TLS RFC [3], and $rand_c$/$rand_s$ are random values exchanged at the beginning of TLS handshake. Note that though it is described as one key for simplicity, $K_{readers}$ is really four keys (just like the "session key" in TLS): an encryption key for data in each direction and a MAC key for data in each direction. Likewise, $K_{writers}$ is really one MAC key for each direction.

Figure 2:
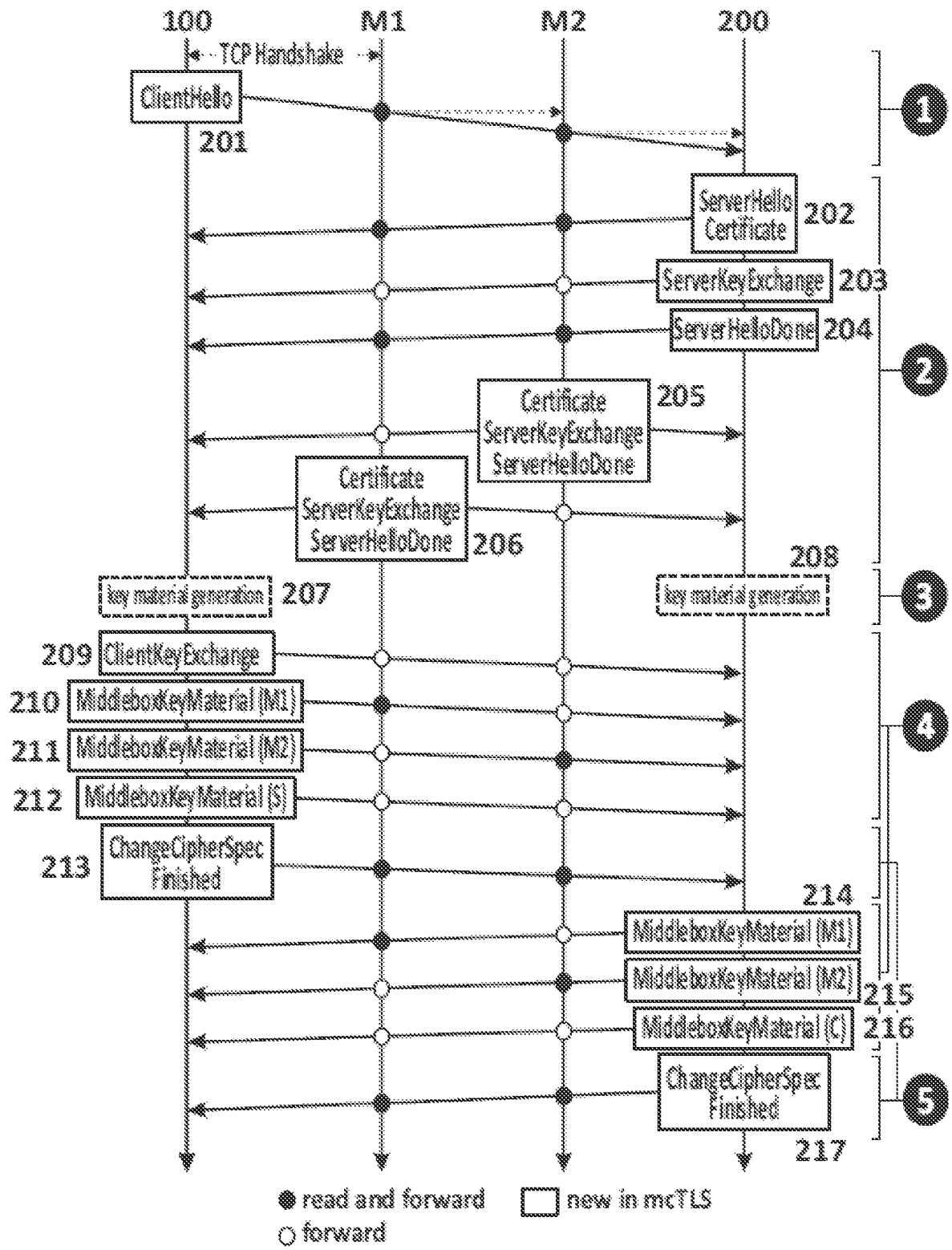
FIG. 2 is an example of the mcTLS handshake protocol proposed by present invention. Shading indicates a difference from TLS handshake protocol.

Handshake Protocol:

FIG. 2 illustrates the steps of a mcTLS handshake protocol, highlighting the differences from TLS. The messages shown are mcTLS records so mcTLS has the same 2-RTT "shape" as TLS.

1. Client Hello. Like TLS, a mcTLS session begins with a ClientHello message (step 201). In mcTLS, the ClientHello carries a MiddleboxListExtenstion, which includes a list of the middleboxes M1, M2 to include in the data session (mechanisms for building this list are outside the scope of this patent) and a list of context keys, their purposes (strings meaningful to the communication application), and each middlebox's M1, M2 access permissions for every context CTX_X. The client 100 opens a TCP connection with the first middlebox M1 and sends the ClientHello (step 201); the middlebox M1 opens a TCP connection with the next hop in the list, forwards the ClientHello, and so on.

2. Certificate & Public Key Exchange. As in TLS, the server 200 responds with its certificate (step 202), and, if the certificate message does not contain enough data for the chosen cipher suite, the server 200 sends an additional key exchange message (step 203). In this step, middleboxes M1, M2 do the same: they send their certificates (steps 205, 206) (and possibly key exchange message) to both the client 100 and the server 200. This step is only needed if the client 100 and server 200 request certificates from the middleboxes M1, M2 and happens in parallel with the ServerCertificate and ClientKeyExchange messages.

3. Key Generation. The endpoints 100, 200 generate (steps 207, 208), pre-master-secret material and partial context key material for each context CTX_X. In step 5, middleboxes M1, M2 combine these partial context key materials to compute the context keys. This approach serves two purposes: it provides contributory key agreement and it ensures that a middlebox M only gains access to a context CTX_X if the client 100 and server 200 both agree.
4. Key Exchange. First, the client 100 (steps 210-212) and server 200 (steps 214-216) exchange the pre-master-secret material using any of the standard key agreement mechanisms supported by TLS. Next, for each context CTX_X, the endpoints 100, 200 send $K^C_{readers}$ and $K^S_{readers}$ to readers and $K^C_{writers}$ and $K^S_{writers}$ to writers. This context key material is sent encrypted under a symmetric key resulting from any standard key exchange protocol. These messages are forwarded to the opposite endpoint so that they can be included in the hash of the handshake messages that is verified at the end of the handshake protocol. The endpoints 100, 200 exchange all partial context key materials encrypted under $K_{endpoints}$. The server 200 in an embodiment may choose to avoid this overhead by asking the client 100 to generate the full context key material.
5. Finished. The mcTLS handshake protocol concludes with the exchange of ChangeCipherSpec and Finished messages (steps 213 and 217), just like TLS. Receipt of the ChangeCipherSpec message prompts middleboxes M1, M2 to compute the context keys. All handshake messages, including those sent to middleboxes M1, M2, are included in the Finished hash. Verifying the hash ensures that both endpoints 100, 200 observe the same sequence of handshake messages.

Contributory Context Keys:

A context key is computed as Key=PRF (secret, label, seed) where secret=$K^C+K^S$, label="a string", and seed=$rand_c+rand_s$. This approach has several advantages; first, client communication application 100 and server communication application 200 both contribute in the creation of a context key which implies that they both agree on the privileges to share with a middlebox M. Second, by using a concatenation operation, instead of XOR operation for instance, the server communication application 200 cannot force Key=0 by choosing $K^S=K^C$ (since a server communication application 200 sees $K^C$ before committing to $K^S$). Though is not clear why a server communication application 200 would try to force a weak key, this is further protection for example to a potential attack.

Client Context Key Distribution Mode

One concern about deploying TLS is that the handshake protocol is computationally demanding, limiting the number of new connections per second servers can process. Similar to TLS, in mcTLS, authentication of the endpoints 100, 200 in the data session is optional. Another burdensome mcTLS operation for servers' applications 200 is generating and encrypting the partial shared secret for distribution to middleboxes M. Alternatively, this operation can be moved to the client only: context keys are generated from the master secret and the client communication application 100 encrypts and distributes them to middleboxes M. This reduces the server load, but it has the disadvantage that agreement about middlebox permissions is not enforced.

It has to be noted that this does not sacrifice contributory key agreement in the sense that both endpoints contribute randomness. The client communication application 100 generates the full context secrets from the secret it shares with the server; if client/server key exchange was contributory, the context keys inherit this benefit. Choosing a handshake mode is left to content providers, who can individually decide how to make this control-performance tradeoff; server communication application 200 indicates its choice to the client communication application 100 in the ServerHello message.

Figure 3:
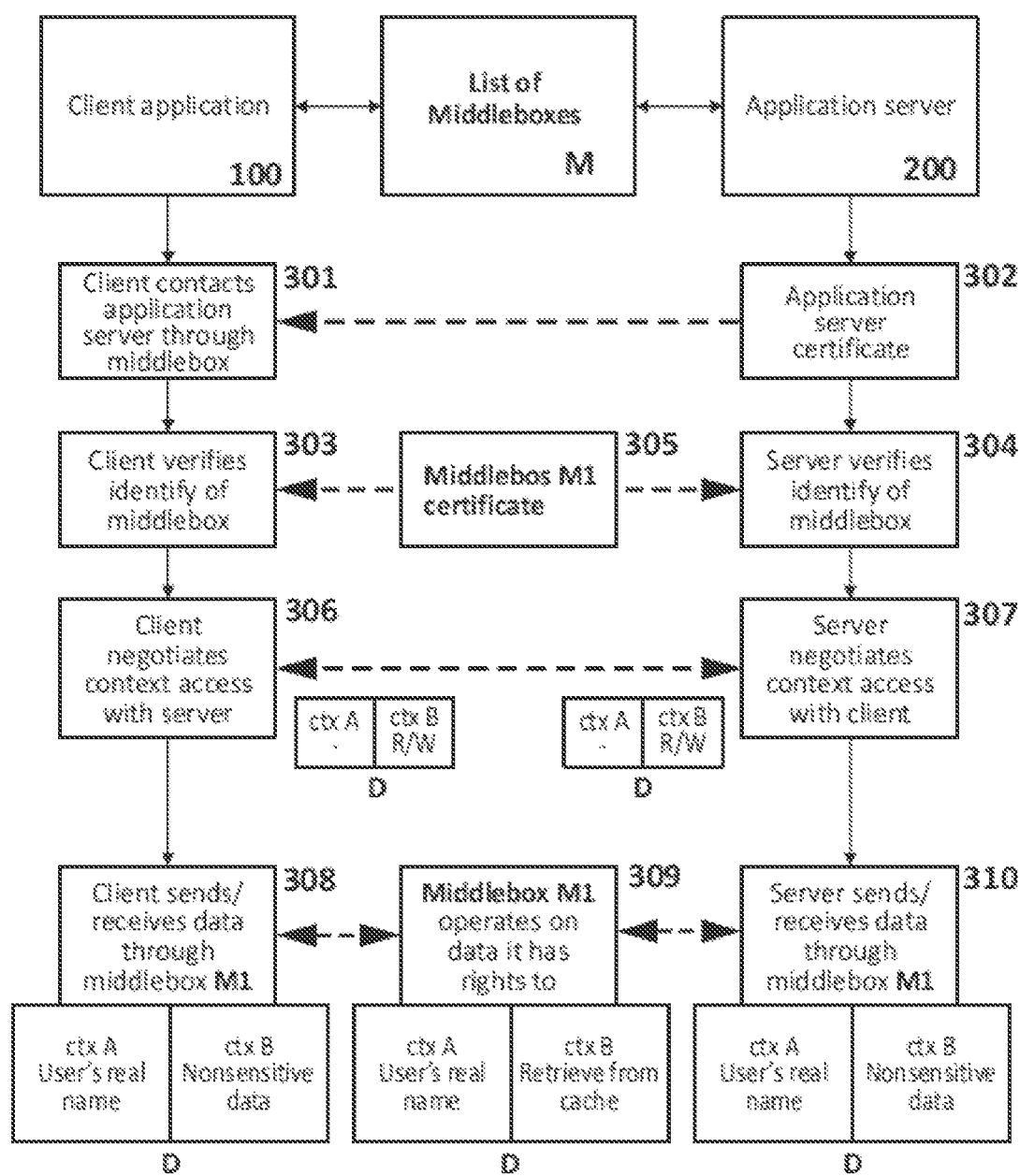
FIG. 3 is a Flowchart illustrating system elements and use for securely enabling in-network functionality over encrypted data sessions.
Figure 4:
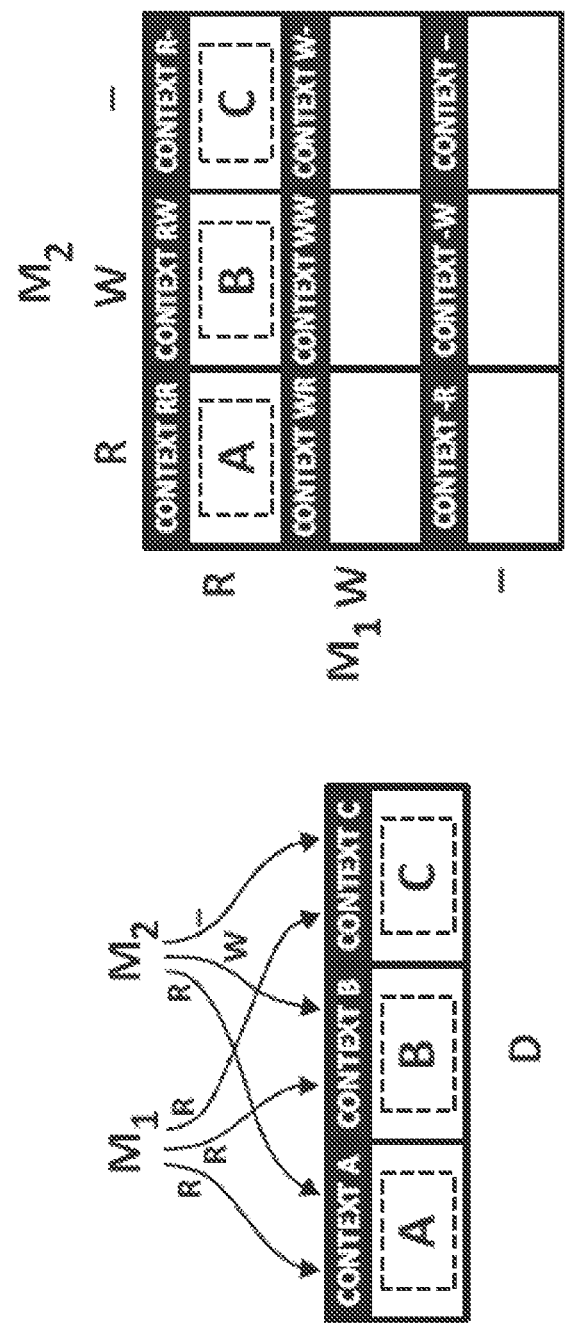
FIG. 4 illustrates a context slicing strategy example that may be used by the proposed method.

With reference now to FIG. 3 therein it is illustrated a high level diagram of an embodiment of present invention for securely enabling in-network functionality over encrypted data sessions. At first (step 301), a client communication application 100 installed in a client computing device (not illustrated) contacts the server communication application 200 installed in a server (not illustrated), exchanging a list of trusted middleboxes M it would like to insert in the data session path. This list can be provided by an operator or found in alternative ways. Present invention does not restrict any specific mechanism. The server 200 responds with its certificate (step 302). Once a middlebox M1 is selected (more than one may be selected) from said list of trusted middleboxes M, the selected middlebox M1 authenticates with both (step 305), the client communication application 100 and the server communication application 200, while regular authentication between server communication application 200 and client communication application 100 continues. Client communication application 100 and server communication application 200 then agree on the privileges the middlebox M1 should receive by defining a set of context CTX_X and context keys (steps 306-307). Finally, Client communication application 100 and server communication application 200 start exchanging data (e.g. communication data D) using the appropriate contexts CTX_X defined above (steps 308-310). FIG. 4 illustrates a possible context slicing strategy that may be used by the proposed method.

There are two ways to think about contexts CTX_X: as portions of the communication data to be transferred or as a configuration of middlebox permissions. For example, supposing a client communication application 100 wants to transfer a document consisting of three portions, CTX_A, CTX_B, and CTX_C via two middleboxes M1, M2. For instance, CTX_A and CTX_B could be two subsets of HTTP headers, while CTX_C could be the HTTP content being transferred. Middlebox M1 should have read access to the entire document and middlebox M2 should read CTX_A, write CTX_B, and have no access to CTX_C, e.g., for privacy reasons middlebox M2 should not be able to read the HTTP content being transferred. The communication application could allocate one context key for each context CTX_X and assign the appropriate permissions (FIG. 4 left), or it could create one context key for each combination of permissions and use the appropriate context key when sending each context CTX_X of the document (FIG. 4 right).

Present invention enables lawful interception of encrypted traffic by mean of contributory context keys. While contributory context keys are not a requirement, for example a competitor approach could enable control to only one endpoint, multiple contexts keys are required to enable selective data access to middleboxes M. One drawback of using multiple context keys is an increase in the number of bytes transferred on the wire, compared to a classic end-to-end approach. Accordingly, unauthorized use of such feature can be detected by traffic inspection. A client communication application 100 running the competitor protocol under inspection can be instrumented to report the content transferred, along with the cipher used and the count of bytes received from the wire. If re-encrypting the received content with the same cipher originates a different byte count from the number of bytes received from the wire, the usage of multiple encryption contexts was likely detected.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

REFERENCES

[1] S. Loreto, J. Mattsson, R. Skog, et al. Explicit Trusted Proxy in HTTP/2.0. Internet-Draft draft-loreto-httpbis-trusted-proxy20-01, IETF Secretariat, February 2014.
[2] R. Peon. Explicit Proxies for HTTP/2.0. Internet-Draft draft-rpeon-httpbis-exproxy-00, IETF Secretariat, June 2012.
[3] https://tools.ietf.org/html/rfc5246

The invention claimed is:

1. A method for securely enabling in-network functionality over encrypted data sessions, the method comprising:
   establishing an encrypted data session between two communication applications, a client communication application and a server communication application, over a communication network, wherein the establishing of the encrypted data session includes performing a handshake protocol to begin the encrypted data session, the performing of the handshake protocol including: transmitting, by the client communication application, to the server communication application, a message that includes a list of at least one intermediate network computer device;
   receiving from and/or transmitting to the server communication application through an intermediate network computer device of the at least one intermediate network computer device, by the client communication application, in the established encrypted data session, encrypted communication data;
   negotiating, by the intermediate network computer device, with both of the two communication applications, a symmetric key using a key exchange protocol;
   generating, by both of the two communication applications, for each one of one or more contexts of the encrypted communication data to which the intermediate network computer device has rights to, half of a shared secret for generating a pseudo random function, the pseudo random function being used by the intermediate network computer device for generating context keys;
   transmitting, by both of the two communication applications, to the intermediate network computer device, the corresponding half of the shared secret in encrypted form using the symmetric key negotiated with the intermediate network computer device;
   computing, by the intermediate network computer device, the context keys using the pseudo random function and the shared secret; and
   performing, by the intermediate network computer device, at least one different action that is different from forwarding the encrypted communication data, wherein
      the computed context keys are used to decrypt the encrypted communication data to perform the at least one different action,
      the forwarding of the encrypted communication data includes forwarding the encrypted communication data either from the client communication application to the server communication application, or from the server communication application to the client communication application,
      the encrypted communication data comprises at least one of: a plurality of data portions, or a plurality of contexts,
      each of the plurality of contexts are encrypted and authenticated via the context keys, and
      the at least one different action is specific for the intermediate network computer device and for one or more of the plurality of contexts of the encrypted communication data.

2. The method of claim 1, wherein the intermediate network computer device provides, to both of the two communication applications, a certificate of the intermediate network computer device, and the two communication applications verify the certificate of the intermediate network computer device before generating the context keys.

3. The method of claim 1, wherein the at least one different action comprises at least one of a read permission or a write permission of the intermediate network computer device on the one or more contexts of the encrypted communication data.

4. The method of claim 1, wherein the encrypted data session is a Transport Layer Security (TLS) session.

5. The method of claim 1, wherein the encrypted data session is an OpenStack message passing session.

6. A system for securely enabling in-network functionality over encrypted data sessions, the system comprising:
   two communication applications, a client communication application and a server communication application, the client communication application running in a client computing device and being configured to establish an encrypted data session with the server communication application over a communication network and to receive from and/or transmit to the server communication application through an intermediate network computer device, encrypted communication data, wherein the establishing of the encrypted data session includes performing a handshake protocol to begin the encrypted data session, the performing of the handshake protocol including: transmitting, by the client communication application, to the server communication application, a message that includes a list of at least one intermediate network computer device, which includes the intermediate network computer device; and the intermediate network computer device, which comprises one or more processors that are configured to:
negotiate, with both of the two communication applications, a symmetric key using a key exchange protocol;
receive, from each of the two communication applications, a corresponding half of a shared secret in encrypted form using the symmetric key;
compute context keys using a pseudo random function and the shared secret; and
perform at least one different action that is different from forwarding the encrypted communication data, wherein
  the computed context keys are used to decrypt the encrypted communication data to perform the at least one different action,
  the forwarding of the encrypted communication data includes forwarding the encrypted communication data either from the client communication application to the server communication application, or from the server communication application to the client communication application,
  the encrypted communication data comprises at least one of: a plurality of data portions, or a plurality of contexts,
  each of the plurality of contexts are encrypted and authenticated via the context keys,
  the at least one different action is specific for the intermediate network computer device and for one or more of the plurality of contexts of the encrypted communication data, and
  both of the two communication applications generate, for each one of one or more contexts of the encrypted communication data to which the intermediate network computer device has rights to, the corresponding half of the shared secret for generating the pseudo random function, the pseudo random function being used by the intermediate network computer device for generating the context keys, and transmit, to the intermediate network computer device, the corresponding half of the shared secret in encrypted form using the symmetric key negotiated with the intermediate network computer device.

7. A computer program product tangibly embodied in a non-transitory machine-readable storage medium, including instructions configured to cause an intermediate network computer device to:
negotiate, with both of two communication applications, a symmetric key using a key exchange protocol, the two communication applications including a client communication application and a server communication application, the client communication application running in a client computing device and being configured to establish an encrypted data session with the server communication application over a communication network and to receive from and/or transmit to the server communication application through the intermediate network computer device, encrypted communication data, wherein the establishing of the encrypted data session includes performing a handshake protocol to begin the encrypted data session, the performing of the handshake protocol including: transmitting, by the client communication application, to the server communication application, a message that includes a list of at least one intermediate network computer device, which includes the intermediate network computer device:
receive, from each of the two communication applications, a corresponding half of a shared secret in encrypted form using the symmetric key;
compute context keys using a pseudo random function and the shared secret; and
perform at least one different action that is different from forwarding the encrypted communication data, wherein
  the computed context keys are used to decrypt encrypted communication data to perform the at least one different action,
  the forwarding of the encrypted communication data includes forwarding the encrypted communication data either from the client communication application to the server communication application, or from the server communication application to the client communication application,
  the encrypted communication data comprises at least one of: a plurality of data portions, or a plurality of contexts,
  each of the plurality of contexts are encrypted and authenticated via the context keys,
  the at least one different action is specific for the intermediate network computer device and for one or more of the plurality of contexts of the encrypted communication data, and
  both of the two communication applications generate, for each one of one or more contexts of the encrypted communication data to which the intermediate network computer device has rights to, the corresponding half of the shared secret for generating the pseudo random function, the pseudo random function being used by the intermediate network computer device for generating the context keys, and transmit, to the intermediate network computer device, the corresponding half of the shared secret in encrypted form using the symmetric key negotiated with the intermediate network computer device.

8. The computer program product of claim 7, wherein the at least one different action comprises at least one of a read permission or a write permission of the intermediate network computer device on the one or more contexts of the encrypted communication data.

* * * * *